(No Model.)
R. C. BARRIE.
MUSIC STAND.
No. 274,166. Patented Mar. 20, 1883.
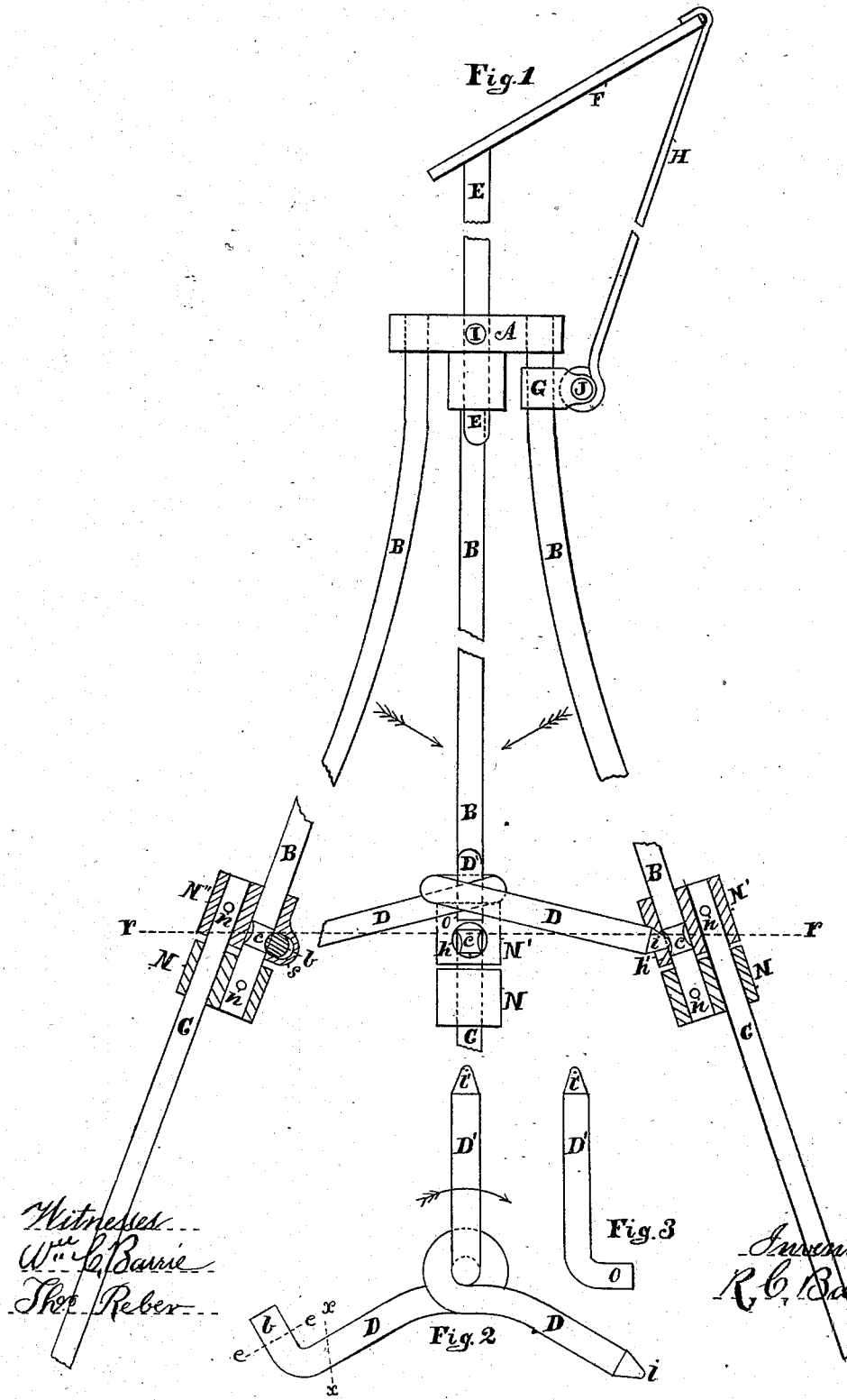

UNITED STATES PATENT OFFICE.

ROBERT C. BARRIE, OF PHILADELPHIA, PENNSYLVANIA.

MUSIC-STAND.

SPECIFICATION forming part of Letters Patent No. 274,166, dated March 20, 1883.

Application filed May 10, 1882. (No model.)

*To all whom it may concern:*

Be it known that I, ROBERT C. BARRIE, of Philadelphia, Pennsylvania, have invented a new and useful Improvement in Music-Stands, of which the following is a specification.

My invention relates to improvements in what are termed "folding music-stands;" and it consists in certain devices, which may be mentioned as follows: the flexible legs B, secured to the hub A, and so arranged that the lower ends of said legs may be extended and held in position by suitable mechanism, the object of my invention being to utilize the inward pressure of the thus extended legs B against a central brace, D, to form an automatic rigid joint or connection between the legs B and C, as will be hereinafter shown and specified.

Letters of reference indicate corresponding parts.

Figure 1 represents an elevation of the stand when in use, and shows the connecting arrangement of the several parts thereof. Fig. 2 shows a plan view of brace D. Fig. 3 is a side elevation of the arm D', showing the projecting end o.

Construction: To construct a stand as represented, a hub or disk, A, is made, of suitable size and material, and to it are secured the legs B, said legs being made of flexible material, the object being to admit of the extension of the lower ends of said legs. To the ends of the legs B are secured the joints N by pins n, the said joints being fitted to slide upon the legs C, which legs in turn have similar joints, N' N'', secured to their upper ends and fitted to the legs B. Two of the sliding joints, N' N', are provided upon their inner sides with the holes h h', which extend into the vertical holes of said joints, the object being explained hereinafter in the operation. The other joint, N'', is provided with an elongated hole, S, passing transversely through said joint, and into which is fitted the end b of the brace D, which is intended to serve as a hinge for said brace. It will be seen in Fig. 1 that the legs B are provided with the recesses c, which come opposite the holes S and h h'. In Fig. 2 the brace D may be constructed in one or more pieces. As represented, it is made of two pieces of wire, of suitable thickness, the one piece, D, being bent, as shown, forming a central hole to receive the end o of the piece D', the said end serving as a hinge, so as to allow the piece D' to fold in direction of the arrow. It will be further seen that the ends i i' are pointed, the object being to admit of their insertion through the holes h h' into the recesses c, the other end, b, passing through the hole S in the joint N'', as represented by section in Fig. 1, said section being upon the line e e. It will also be seen that the brace D is represented as broken upon the line x x. At the top of Fig. 1 will be seen fitted to the leg B a common adjustable clamp, G, secured to said leg by a common thumb-screw, J. It will also be seen that the rod H connects said clamp with the top of the book-rest F, the object being to firmly secure said rest when in use, while at the same time it may be raised or lowered in connection with the rod E.

The operation of the device is as follows: The point i of the brace is inserted in the hole h', care being taken to see that joints N' N' are close together, when the recesses c will receive said point. The point i' is then inserted into the hole h in a similar manner, which completes the extension of the legs and the rigid formation of the stand; and it will here be evident that the tension of the legs B will press toward the center in direction of the arrow, while the center of the brace D being above the center line, r r, said pressure will force the points i i', and also the end b, into the recesses c, thus keeping the joints rigid when in use. The rod E may be raised and secured by means of a common thumb-screw at I, after which the connecting-rod H may be adjusted and secured to the leg B, as shown. To refold the stand the rod E should be lowered, which will relieve the rod H, when said rod may be swung in a downward direction alongside of the legs B. The legs C are next extended until the point i is relieved from the hole h', when the point i' will also be relieved, and the legs B will spring toward a vertical position. It will be evident, then, that the legs C will slide toward the hub A upon the legs B, completing the folding of the stand.

Knowing that there are other devices known as "folding music-stands," I do not claim such, broadly; nor do I wish to confine myself to the exact construction as shown, as there are other devices which may be used without departing from the spirit of my invention. Therefore,

What I claim as new, and desire to secure by Letters Patent, is—

In a folding music-stand, the legs B, made of flexible material and secured to the hub A, in combination with the sliding joints N N', legs C, and a brace, D, the whole arranged to operate together substantially as shown and described.

ROBT. C. BARRIE.

Witnesses:
  THEO. RELER,
  W. SYKES.